US011446960B2

(12) United States Patent
Galang et al.

(10) Patent No.: US 11,446,960 B2
(45) Date of Patent: Sep. 20, 2022

(54) MODULAR AXLE AND MOTIVE WHEEL SYSTEM FOR A VEHICLE

(71) Applicant: Toyota Motor Engineering & Manufacturing North America, Inc., Plano, TX (US)

(72) Inventors: Abril A. Galang, Ann Arbor, MI (US); Justin J. Chow, Los Angeles, CA (US); Robert C. MacArthur, Ypsilanti, MI (US); Joshua D. Payne, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 293 days.

(21) Appl. No.: 16/551,869

(22) Filed: Aug. 27, 2019

(65) Prior Publication Data

US 2021/0061005 A1   Mar. 4, 2021

(51) Int. Cl.
*B60K 1/02* (2006.01)
*B60B 11/02* (2006.01)
(Continued)

(52) U.S. Cl.
CPC ............ *B60B 35/121* (2013.01); *B60B 11/02* (2013.01); *B60B 35/18* (2013.01); *B60K 1/02* (2013.01); *B60K 7/0007* (2013.01)

(58) Field of Classification Search
CPC .............................. B60K 7/00; B60K 7/0007; B60K 2007/0092; B60K 2007/0038;
(Continued)

(56) References Cited

U.S. PATENT DOCUMENTS 2,353,730 A * 7/1944 Joy ........................ B60K 17/14
91/503
2,569,861 A * 10/1951 Moore .................... B60B 11/06
180/24.03
(Continued)

FOREIGN PATENT DOCUMENTS

GB        2456349 A    7/2009
GB        2456350 A    7/2009
(Continued)

*Primary Examiner* — Emma K Frick
(74) *Attorney, Agent, or Firm* — Christopher G. Darrow; Darrow Mustafa PC (57) ABSTRACT

A modular axle and motive wheel system comprises: a pair of opposed axle ends and attached axle hubs; a pair of inner motive wheels each comprising an outer surface and configured for radially extending rotatable disposition on the hubs; and a pair of inner electric hub motors each comprising an inner stator and an inner rotor, the inner stators configured for attachment to the axle hubs, the inner rotors configured for attachment to the outer surface of the inner motive wheels, the inner rotors configured for rotation of the inner motive wheels by and about the inner stators; the inner motive wheels configured for attachment of a pair of outer motive wheels each comprising an outer electric hub motor comprising an outer stator configured for selective attachment to the inner stator and an outer rotor configured for attachment to the outer motive wheel and rotation of the outer motive wheels.

18 Claims, 9 Drawing Sheets

(51) Int. Cl.
  *B60B 35/12* (2006.01)
  *B60K 7/00* (2006.01)
  *B60B 35/18* (2006.01)
(58) Field of Classification Search
  CPC . B60K 2007/003; B60B 35/14; B60B 35/121; B60B 35/18; B60B 11/02; B60B 11/00; B60B 11/04; B60B 11/06
  See application file for complete search history.

(56) References Cited

U.S. PATENT DOCUMENTS

| | | | | |
|---|---|---|---|---|
| 2,748,879 A | * | 6/1956 | Robert | B60K 17/10 180/24.07 |
| 3,359,039 A | * | 12/1967 | Leona | B60B 11/02 301/39.1 |
| 3,532,384 A | * | 10/1970 | Williams, Jr. | B60B 3/16 301/36.1 |
| 3,770,074 A | * | 11/1973 | Sherman | B60L 3/0061 180/65.6 |
| 3,786,889 A | * | 1/1974 | Kelley | B60B 11/00 180/253 |
| 3,897,843 A | * | 8/1975 | Hapeman | B60K 17/14 180/65.51 |
| 4,007,968 A | * | 2/1977 | Solis | B60B 11/02 301/38.1 |
| 4,164,358 A | * | 8/1979 | Entrup | B60B 11/02 296/198 |
| 4,330,045 A | * | 5/1982 | Myers | B60L 3/0076 180/65.51 |
| 4,389,586 A | * | 6/1983 | Foster | B60K 7/0007 310/67 R |
| 4,799,564 A | * | 1/1989 | Iijima | B60K 7/0007 180/65.51 |
| 5,551,349 A | * | 9/1996 | Bodzin | F16L 55/30 104/138.2 |
| 5,813,487 A | | 9/1998 | Lee et al. | |
| 6,135,259 A | * | 10/2000 | Forster | B60K 7/0015 180/307 |
| 6,276,474 B1 | * | 8/2001 | Ruppert | B60K 17/22 180/65.6 |
| 6,298,932 B1 | * | 10/2001 | Bowman | B60B 11/00 180/6.5 |
| 6,328,123 B1 | * | 12/2001 | Niemann | F16D 55/40 180/65.51 |
| 6,588,538 B2 | * | 7/2003 | Hinton | B60B 11/06 180/363 |
| 6,637,834 B2 | * | 10/2003 | Elkow | B60C 5/22 152/415 |
| 6,733,088 B2 | * | 5/2004 | Elkow | B60B 11/00 301/36.1 |
| 6,890,039 B2 | * | 5/2005 | Chung | B60B 11/00 301/36.2 |
| 6,922,004 B2 | * | 7/2005 | Hashimoto | H02K 16/00 310/268 |
| 7,147,073 B2 | * | 12/2006 | Mollhagen | B60K 7/0007 180/65.51 |
| 7,466,049 B1 | * | 12/2008 | Vancea | B60K 6/46 310/75 C |
| 7,556,112 B2 | | 7/2009 | Suzuki et al. | |
| 7,621,357 B2 | | 11/2009 | Suzuki et al. | |
| 7,757,795 B2 | * | 7/2010 | Chien | B60B 11/02 180/24.03 |
| 8,100,806 B2 | * | 1/2012 | Shibukawa | B60K 17/046 475/159 |
| 8,215,423 B2 | * | 7/2012 | Terry | G21F 5/14 180/24 |
| 8,342,612 B2 | * | 1/2013 | Sgherri | B60K 17/046 301/6.5 |
| 8,459,386 B2 | | 6/2013 | Pickolz | |
| 8,562,472 B2 | * | 10/2013 | Shinohara | F16H 57/0486 475/159 |
| 8,733,478 B2 | * | 5/2014 | Chapman | F16M 11/28 180/24.07 |
| 8,746,396 B2 | * | 6/2014 | Vallejo | B60B 27/001 180/383 |
| 8,747,271 B2 | * | 6/2014 | Vallejo | B60B 35/125 475/149 |
| 8,925,659 B2 | | 1/2015 | Peters | |
| 9,216,612 B2 | * | 12/2015 | Zdrahal | B60B 11/02 |
| 9,308,810 B1 | | 4/2016 | Kurdy | |
| 9,387,758 B2 | | 7/2016 | Heinen et al. | |
| 9,428,265 B2 | | 8/2016 | Cox | |
| 9,475,342 B2 | | 10/2016 | Feng | |
| 9,550,414 B2 | * | 1/2017 | Kudo | B60B 27/0015 |
| 9,616,706 B2 | * | 4/2017 | Benoit, Jr. | B60B 11/02 |
| 9,688,099 B2 | * | 6/2017 | Niemczyk | B60B 11/02 |
| 9,963,178 B2 | * | 5/2018 | Guerin | A01B 51/04 |
| 9,969,211 B2 | * | 5/2018 | Niemczyk | B60B 11/02 |
| 10,005,352 B2 | * | 6/2018 | Aich | B60L 50/50 |
| 2002/0175009 A1 | * | 11/2002 | Kress | B60K 17/046 180/199 |
| 2010/0025131 A1 | | 2/2010 | Gloceri et al. | |
| 2010/0194180 A1 | * | 8/2010 | Gibson | B60K 7/0007 301/36.1 |
| 2012/0018984 A1 | * | 1/2012 | Oriet | B60G 5/02 280/676 |
| 2014/0340013 A1 | | 11/2014 | Li et al. | |
| 2017/0225684 A1 | | 8/2017 | Alshamrani | |
| 2018/0236813 A1 | * | 8/2018 | Ochiai | B60K 17/043 |
| 2019/0058372 A1 | * | 2/2019 | Yamamoto | F16H 3/48 |
| 2020/0290450 A1 | | 9/2020 | Van Seventer | H02K 7/14 |
| 2021/0061093 A1 | * | 3/2021 | Li | B60B 35/002 |
| 2021/0061095 A1 | * | 3/2021 | Galang | B60K 17/354 |
| 2021/0122227 A1 | * | 4/2021 | Bindl | B60T 1/062 |
| 2021/0221218 A1 | * | 7/2021 | Li | B60T 1/067 |
| 2021/0252967 A1 | * | 8/2021 | Iwabuchi | B60B 35/14 |

FOREIGN PATENT DOCUMENTS

| | | |
|---|---|---|
| GB | 2472297 A | 2/2011 |
| WO | 2009090386 A2 | 7/2009 |

* cited by examiner

MODULAR AXLE AND MOTIVE WHEEL SYSTEM FOR A VEHICLE

FIELD OF THE INVENTION

The embodiments disclosed herein relate generally to a modular axle and motive wheel system for a vehicle. More particularly, it relates to a modular axle and motive wheel system for a vehicle that comprises stackable hub motors and/or wheels on a single axle that may include stackable motive wheels as well as stackable non-motive wheels.

BACKGROUND

The motive wheels and corresponding motive axles of automotive vehicles, particularly trucks and sport utility vehicles (SUV's), are generally configured with one wheel on each side of the vehicle. In some vehicles that are designed to carry or tow heavier than normal loads, motive axles are designed and configured to include two (i.e. dual) motive wheels on each side. A vehicle, generally a truck or an SUV, with two motive wheels per side is often referred to as a dually. Dually vehicles are generally designed with heavy duty axles and other associated driveline components in order to carry or tow the heavier than normal loads.

Generally, the entire vehicle powertrain of dually vehicles, including the engine torque output, must be increased in order to provide the motive power necessary to carry or tow the heavier than normal loads. As such, the entire dually vehicle, particularly the engine and powertrain, must be reconfigured as compared to a vehicle that has only one motive wheel per side. While vehicles with both types of motive wheel and motive axle are widely used, and very effective, the configuration of the including the number of wheels per side, the axle load rating, the capacity of the powertrain, and engine output are generally fixed at the time of vehicle manufacture are generally not easily reconfigurable after manufacture.

Therefore, it would be very desirable to provide a vehicle with a motive wheel and motive axle configuration that would be easily and flexibly reconfigurable from a one wheel per side to a two wheel per side configuration, and vice versa, to increase and/or decrease the load carrying capacity of the axle and the corresponding vehicle.

SUMMARY OF THE INVENTION

In one embodiment, a modular axle and motive wheel system for a vehicle is disclosed. The modular axle and motive wheel system comprises: a pair of opposed axle ends comprising an axle, the opposed axle ends axially spaced apart along an axle axis; a pair of axle hubs attached to the axle ends; a pair of inner motive wheels each comprising an inner surface and an outer surface and configured for radially extending rotatable disposition on the axle hubs; and a pair of inner electric hub motors each comprising an inner stator and an inner rotor, the inner stators configured for selective attachment to and detachment from the axle hubs, the inner rotors configured for selective attachment to and detachment from the outer surface of the inner motive wheels, the inner rotors configured for reversible motive rotation of the inner motive wheels by and about the inner stators; the inner motive wheels configured for selective attachment and detachment of a pair of outer motive wheels outboard of the inner motive wheels, the outer motive wheels each comprising an inner surface and an outer surface and comprising an outer electric hub motor comprising an outer stator and an outer rotor, the outer stators configured for selective attachment to and detachment from the inner stators, the outer rotors configured for attachment to the outer surface of the outer motive wheels, the outer rotors configured for reversible motive rotation of the outer motive wheels by and about the outer stators.

In another embodiment, a modular axle and motive wheel system for a vehicle is disclosed. The modular axle and motive wheel system for a vehicle comprises: a pair of opposed axle ends comprising an axle, the opposed axle ends axially spaced apart along an axle axis; a pair of axle hubs attached to the axle ends; a pair of inner motive wheels each comprising an inner surface and an outer surface and configured for radially extending rotatable disposition on the axle hubs; and a pair of inner electric hub motors each comprising an inner stator and an inner rotor, the inner stators configured for selective attachment to and detachment from the axle hubs, the inner rotors configured for selective attachment and detachment from the outer surface of inner motive wheels, the inner rotors configured for reversible motive rotation of the inner motive wheels by and about the inner stators; the inner stators configured for attachment of either, a pair of spacers each having an inner end configured for selective attachment and detachment to the inner stator and an outer end configured for selective attachment and detachment to one of a pair of outer electric hub motors or one of a pair of outer non-motive wheels, or one spacer having an inner end configured for selective attachment and detachment to one of the inner stators and an outer end configured for selective attachment and detachment to a non-motive wheel.

In yet another embodiment, a modular axle and motive wheel system for a vehicle is disclosed. The modular axle and motive wheel system for a vehicle comprises: a pair of opposed axle ends comprising an axle, the opposed axle ends axially spaced apart along an axle axis; a pair of axle hubs attached to the axle ends; a pair of inner motive wheels each comprising an inner surface and an outer surface and configured for radially extending rotatable disposition on the axle hubs; and a pair of inner electric hub motors each comprising an inner stator and an inner rotor, the inner stators configured for attachment to the axle hubs, the inner rotors configured for attachment to the outer surface of the inner motive wheels, the inner rotors configured for reversible motive rotation of the inner motive wheels by and about the inner stators, wherein each of the inner motive wheels is configured for removal and replacement by a non-motive wheel.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

A modular axle and motive wheel system for a vehicle is disclosed. The modular axle and motive wheel system advantageously provide the ability to stack multiple hub motors, or a spare tire/hub motor combination, in a dual wheel configuration on a single vehicle axle. The modular axle and motive wheel system allow a spare tire to added to an existing hub motor/tire without having to remove the hub motor from the existing wheel. The modular axle and motive wheel system may also be configured by the addition of additional motors and/or motive wheels to provide additional vehicle torque capabilities and can be added to vehicles for increased towing capacity, added horsepower, and the like. The modular axle and motive wheel system may also be configured by the addition of additional motive or non-motive wheels to provide additional vehicle load carrying capabilities and can be added to vehicles for increased load capacity, including towed load capacity, and the like. The modular axle and motive wheel system may also enable vehicle manufacturers to make smaller trucks with hub wheel towing options.

In one embodiment, the wheel connection point to a vehicle axle is modularly designed to be able to accept more than one wheel such that they are interlocked together. In one embodiment the axle and associated vehicle may be configured to add two or more motive wheels (i.e. integrated hub motors and wheels) and convert a vehicle with one motive wheel per side into a vehicle with dual motive wheels per side, or a dually configuration, and the added wheels may be configured to rotate independently of the existing wheels or in tandem (dependently) with the existing wheels. This embodiment increases the vehicle's torque output and load carrying capacity of the suspension. In another embodiment the axle and associated vehicle may be configured to add two or more hub motors and convert a vehicle with one motive wheel comprising one hub motor per side into a vehicle with two or more hub motors per side. This embodiment increases the vehicle's torque output without increasing the and load carrying capacity of the suspension. In another embodiment the axle and associated vehicle may be configured to add two non-motive wheels (i.e. additional wheels without additional hub motors) and convert a vehicle with one motive wheel per side into a vehicle with two wheels, including one motive and one non-motive wheel, per side to provide additional load carrying capacity of the suspension to the vehicle without adding additional hub motors and the associated torque output capacity. In yet another embodiment the axle and associated vehicle may be configured to add or substitute one motive or non-motive wheel and provide a powered or unpowered spare tire/wheel. The unpowered spare tire would allow vehicle movement, which may be in a limited capacity, e.g., 35 mph, 50 mph, etc., if the tire on the wheel with the integrated hub motor went flat but would otherwise maintain the load carrying capacity of the suspension and vehicle. The powered spare tire would maintain the torque output and the load carrying capacity of the suspension and vehicle and could be added to or substituted for the hub motor and wheel with the flat tire.

As used herein, the terms front or forward or rear or rearward or aft refer to the front or rear of the article or vehicle, or to a direction toward the front or rear of the article or vehicle, respectively. The terms longitudinal or along the length refers to a direction that extends along or generally parallel to an article or vehicle centerline between the front and the rear, or from one end to an opposed end. The terms transverse, lateral, or along the width, or left-right refers to a direction that is orthogonal, or substantially orthogonal, to the longitudinal direction. The terms up or upward or down or downward refer to the top or bottom of the article or vehicle, or to a direction substantially toward the top or bottom of the article or vehicle, respectively. The terms in or inner or inward refer to a direction toward the center of the article or vehicle, and out or outer or outward refers to the opposite direction away from the center or central portion of the article or vehicle.

Figure 1:
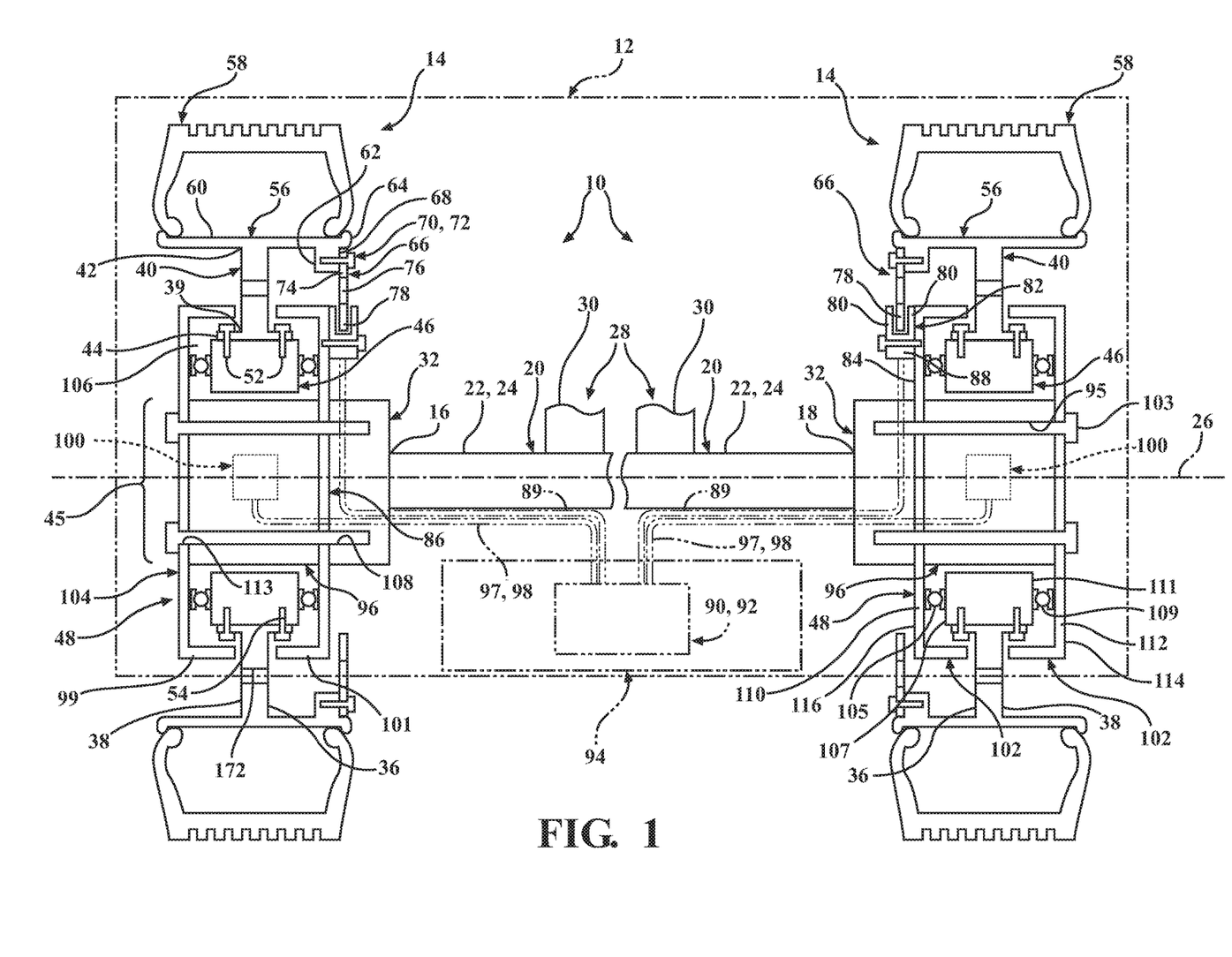
FIG. 1 is a schematic cross-sectional view of an embodiment of a modular axle and motive wheel system, as described herein.

Referring to the figures, and particularly to FIG. 1, a modular axle and motive wheel system 10 for a vehicle 12 is disclosed that comprises an axle 20 and a pair of motive wheels 14 disposed proximate opposite ends thereof, which may also be referred to as drive wheels 14. The vehicle 12 may include any type of motorized wheeled vehicle in which vehicle movement is provided and supported on spaced apart rotatable motive wheels that are rotatably disposed on an axle. The axle 20 may comprise a front axle, real axle, or front and rear axle of the vehicle 12, and motive wheels 14 may comprise steerable or non-steerable wheels.

The vehicle 12 may include all manner of automotive vehicles, including all manner of cars, sport and other types of utility vehicles (SUV), and trucks, including light-duty, medium-duty, and heavy-duty trucks. The vehicle 12 may also include all manner of recreational vehicles (RV's), all terrain vehicles (ATV's) and side-by-side vehicles, including utility or utility task vehicles (UTV's) and multipurpose off-highway utility vehicles (MOHUV's). The vehicle 12 may comprise an electric vehicle (EV), where all of the motive power of the vehicle wheels is provided by electric hub motors as described herein, or a hybrid electric vehicle where the motive power of some of the vehicle wheels is provided by electric hub motors as described herein.

The modular axle and motive wheel system 10 may be used on the vehicle 12 in any desired manner or location, including as a front axle (e.g. in a front wheel drive (FWD) vehicle), a rear axle (e.g. in a rear wheel drive (RWD) vehicle), or as a front and rear axle (e.g. in an all-wheel drive (AWD) or four wheel drive (4WD) vehicle).

The modular axle and motive wheel system 10 comprises a pair of opposed axle ends 16, 18 comprising an axle 20. The axle 20 may comprise any suitable type of axle. In one embodiment, the axle 20 may include a continuous axle 22, including a solid axle or a hollow axle, that extends continuously between the axle ends 16, 18. In another embodiment, the axle 20 comprises a pair of opposed spaced apart spindles 24 disposed on opposite sides of the vehicle 12 that are axially aligned along an axle axis 26. The opposed axle ends 16, 18 are axially spaced apart along the axle axis 26. Regardless of the type of axle 20 employed, the axle is configured for operable attachment to a vehicle suspension 28, which may comprise all manner of conventional vehicle suspensions, including an independent suspension 30 that independently suspends the motive wheel 14 that it is operably attached to. The axle 20 is fixed and does not rotate about the axle axis 26. The axle 20 may be made from any suitable material including various metals, such as, for example, various steel, aluminum, magnesium, or titanium alloys.

The modular axle and motive wheel system 10 also comprises a pair of axle hubs 32 attached to the axle ends 16, 18. The axle hubs 32 are configured for attachment to the axle 20 at the axle ends 16, 18. The axle hubs 32 may be attached to respective opposed axle ends 16, 18 by any suitable attachment, including by the use of a threaded fastener or fasteners (e.g. threaded bolt or stud/nut, a weld, or a similar fixed or selectively attachable and detachable attachment. The axle hubs 32 are fixed to the axle ends 16, 18 and like the axle 20 are non-rotatable. In one embodiment the axle hubs 32 are generally cylindrical and may be made from any suitable high strength material including various metals, such as, for example, various steel, aluminum, magnesium, or titanium alloys.

The modular axle and motive wheel system 10 also comprises a pair of inner motive wheels 14 each comprising an inner surface 36 and an outer surface 38 and configured for radially extending rotatable disposition on respective axle hubs 32. The inner motive wheels 14 are rotatably disposed on the respective axle hubs 32 in mirror image positions with the respective inner surfaces 36 facing the axle 20 and the respective outer surfaces 38 facing away from the axle. The inner motive wheels 14 each comprise a wheel hub 40 that is generally cylindrical and extends radially outwardly away from the axle axis 26. The wheel hub 40 comprises inner surface 36, outer surface 38, inner end 39, and outer end 42. The wheel hub 40 also comprises rotor flange 44 that extends axially outwardly away from the inner surface 36 and the outer surface 38 at inner end 39 and extends peripherally about a rotor opening 45 that is concentric about the axle axis 26. The rotor flange 44 is configured for selectively attachable and detachable attachment of the inner rotor 46 of electric inner hub motor 48 that is disposed within rotor opening 45, such as, for example, by the attachment of a plurality of threaded fasteners 52 to the inner rotor 46 that are received through flange bores 54. The inner motive wheel 14 also comprises wheel rim 56 that is attached to the outer end 42 of wheel hub 40 and that extends axially outwardly away from the inner surface 36 and the outer surface 38 and is configured to receive a tire 58, such as a selectively inflatable and deflatable tire, in sealing engagement on a rim surface 60 in a conventional manner. The wheel rim 56 also comprises a brake rotor flange 62 that is attached to the wheel rim and extends radially inwardly toward the axle axis 26 proximate inner rim end 64. The inner motive wheels 14, including the wheel hubs 40, wheel rims 56, and brake rotor flange 62, and the elements and components thereof, may be formed from any suitable material, including various metals, such as, for example, various alloys of steel, aluminum, magnesium, and titanium.

The brake rotor flange 62 is configured for selective attachment and detachment of a brake rotor 66 to an inner side 68 using an attachment device 70. Any attachment device 70 suitable for selective attachment and detachment of the brake rotor may be used, such as, for example, a plurality of threaded brake rotor fasteners 72, including threaded bolts or a combination of threaded studs and threaded nuts.

The brake rotor 66 comprises a cylindrical ring 74 that includes a plurality of circumferentially spaced apart slots 76, such as circumferentially-extending radially spaced apart slots, and a caliper portion 78 that is configured for selective frictional engagement and friction braking of the vehicle with selectively movable brake pads 80 of a brake caliper 82. The brake caliper 82 is configured for actuation as described herein to provide a braking action to the respective inner motive wheels 14. The brake caliper 82 is configured for selectively attachable and detachable attachment to the outer surface 84 of the inner portion 86 of inner motor housing 102. The brake caliper 82 may be actuated to move the selectively moveable brake pads 80 inwardly and compress them against the caliper portion 78 by any suitable actuator, including a hydraulic actuator (not shown) or electrical actuator 88. Electrical actuator 88 may include any suitable actuator, including an electric motor or an electric solenoid and may be in signal and power communication by brake power bus 89 with any suitable vehicle controller 90, such as motor controller 92, for example, that is configured for controlled application of power from a vehicle power source or battery, such as, for example, the battery 94. The battery 94 for the vehicle 12 propulsion may comprise any suitable battery electrodes and electrolytes, including lithium-ion and lithium-ion polymer batteries.

The modular axle and motive wheel system 10 also comprises a pair of electric inner hub motors 48 each comprising an inner stator 96 that has an axially-extending cylindrical shape and is configured to be fixed and stationary and a selectively and inner rotor 46 that is configured for selectively reversible rotation and is disposed radially outwardly of and concentric with the inner stator 96 and that also has an axially-extending cylindrical shape. The inner hub motor 48 may comprise any suitable type of outer rotation radial flux electric motor comprising a fixed inner stator 96 and a selectively and reversibly rotatable inner rotor 46, including various alternating current (AC) and direct current (DC) powered electric motors, including both brushed (BDC) and brushless (BLDC) motors. In one embodiment, the inner hub motor 48 comprises an AC electric motor and conventional power electronics including a current inverter and a voltage converter. The DC power and current from the battery 94 is converted to AC power and current using the power inverter and the voltage from the battery is stepped up to a high voltage (e.g. about 210 VDC to about 650 VAC) using the voltage converter. The power electronics may be disposed in the inner hub motor 48, particularly the inner stator 96, or elsewhere in the vehicle 12, including as a part of a vehicle controller 90, including the motor controller 92, or as part of the battery 94, or on a standalone basis. The high voltage AC power may be supplied to the inner hub motor 48 by any suitable inner electrical power and/or signal communication device 97, such as an inner power bus 98 that comprises an electrical conductor configured to electrically communicate high voltage from the power electronics, which may be electrically connected to the inner hub motor 48 by any suitable electrical power attachment, including inner electrical connector 100.

The inner stator 96 and inner rotor 46 are disposed within an inner motor housing 102 that is generally cylindrical and comprises an outer portion 104 and an opposed inner portion 86 that define inner motor chamber 106 for housing the components of the inner hub motor 48, including the inner stator 96 and inner rotor 46. The outer portion 104 and opposed inner portion 86 may have any suitable shape to define the inner motor chamber 106. In various embodiments illustrated in FIGS. 1-7, the outer portions 104 and opposed inner portions 86 comprise respective generally hollow cylinders of the same diameter that define outer sidewalls 99 and inner sidewalls 101 and respective attached outer bases 110 and inner bases 112 orthogonal to the respective sidewalls that enclose respective outer ends 114 and inner ends 116. Outer portions 104 and inner portions 86 define respective U-shaped cross sections. The outer portions 104 and opposed inner portions 86 are configured for placement in an opposing relationship with the outer bases 110 and inner bases 112 disposed away from one another. Placement of outer portions 104 and opposed inner portions 86 in an opposing relationship define the inner motor chambers 106 comprising a cylindrically shaped volume that is configured to house the cylindrical components of the inner hub motor 48 between them. The inner rotor 46 is rotatably disposed within the inner motor chamber 106 and non-rotatable inner housing 102, and with respect to the non-rotatable stator 96, between an inner bearing 105 disposed against an inner side 107 of the rotor and the outer base 110 and an outer bearing 109 disposed against an outer side 111 of the rotor and the inner base 112. The inner bearing 105 and outer bearing 109 rotatably support the rotation of the inner rotor 46 and the inner motive wheel 14 described herein.

The inner motor housings 102 and inner stators 96 are configured for selective attachment to and detachment from the axle hubs 32 by any suitable stator attachment, such as, for example, a plurality of threaded inner stator fasteners 103, such as stator bolts and/or rotor studs (attached to the axle hub 32) and nuts, that are disposed in a corresponding plurality of inner housing bores 113 that extend through the inner motor housing 102 and stator bores 95 that extend axially through the inner stators 96 and may be tightened into a corresponding plurality of threaded axle hub bores 108 to attach the inner motor housings 102 and inner stators 96 to the axle hubs.

The inner rotors 46 are configured for selective attachment to and detachment from the outer surface 38 of the inner motive wheels 14. The inner rotors 46 are configured for reversible motive rotation of the inner motive wheels 14 by and about the inner stators 96 by controlled application of power to the stator 96 from the motor controller 92 resulting in a selectively reversible rotational electromotive force against the inner rotor 46 that is configured to rotate the inner motive wheel 14 as is known in the art.

The inner hub motors 48 may be operated in a driving mode where power from the battery 94 is applied to the inner hub motors and used for vehicle propulsion in a forward or reverse direction, a freewheeling mode where the inner hub motors are electrically disconnected from the battery, and a regenerative braking mode wherein a braking signal input causes the motor controller 92 to command operation of the inner hub motors in a reverse direction which slows the vehicle in its current direction of operation and causes generation of power for storage in the battery 94. In driving situations where regenerative braking in insufficient to provide sufficient stopping power for the vehicle, a vehicle controller 90, such as motor controller 92 may actuate the brake calipers 82 to provide additional stopping power from the friction brakes as described herein.

The modular axle and motive wheel system 10 of FIG. 1 is very advantageous because the inner motive wheels 14 and the inner hub motors 48, including both the inner stators 96 and inner rotors 46, can be removed from the exterior of the vehicle 12 and the outward facing side of the inner motive wheel 14. Therefore, the tires 58 and the inner hub motors 48 and their components may be more easily serviced by a human user without the need to access the inward facing side of the inner motive wheel 14 while the wheel is attached to the vehicle, or to get under the vehicle, or to elevate the vehicle. This greatly simplifies routine repair and replacement service of any or all of the components of the inner motive wheels 14, particularly the tires 58, inner hub motors 48, wheel hubs 40, and wheel rims 56 in the event of damage or failure. It also greatly simplifies performance upgrades of the inner motive wheels 14, including replacing the tires 58, inner hub motors 48, wheel hubs 40, and wheel rims 56 with higher performance counterparts, such as, for example, a new inner hub motor 48 that provides a higher torque output than an original inner hub motor, or that consumes less power to provide an equivalent torque output and or another motor performance characteristic (i.e. is more efficient).

Figure 2:
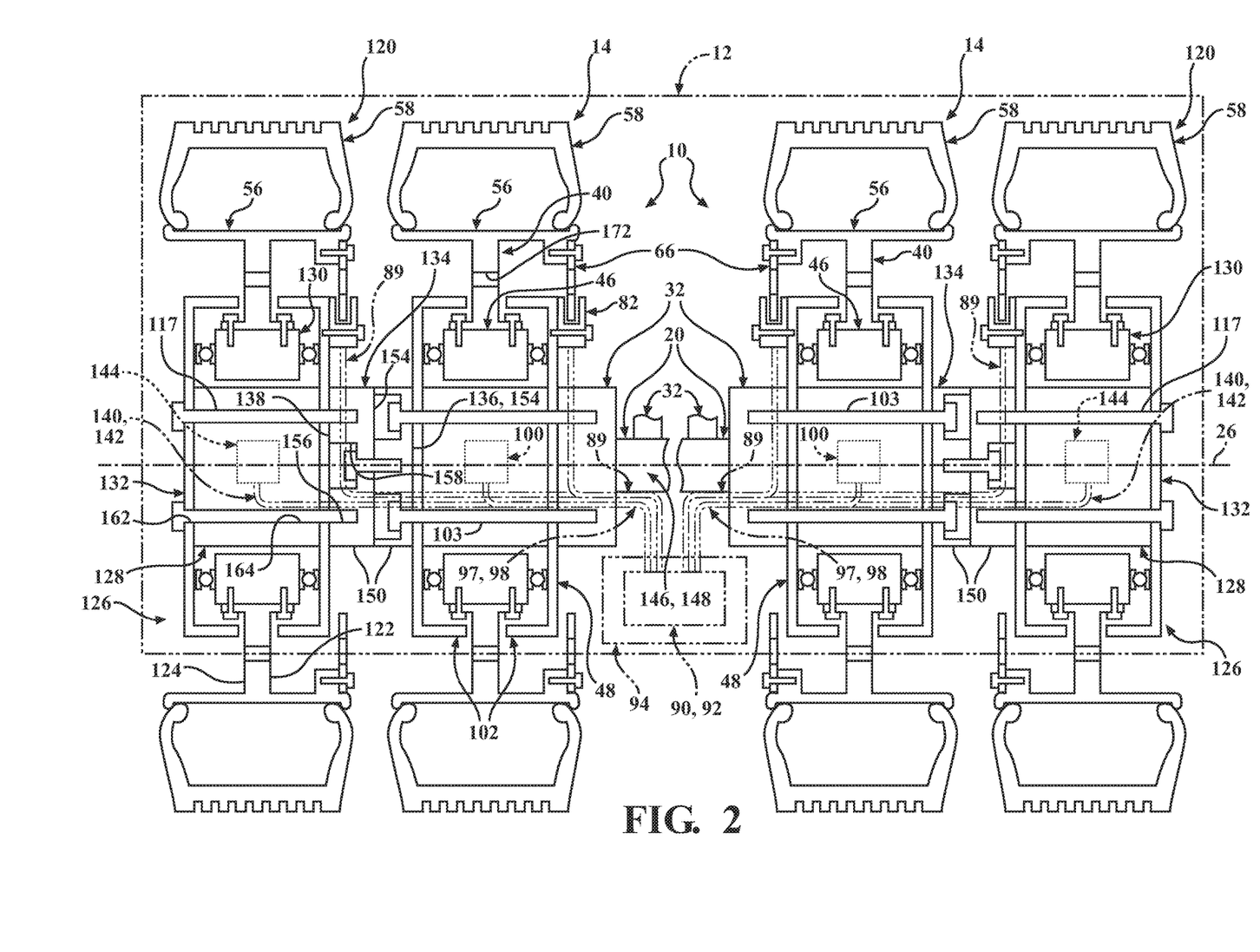
FIG. 2 is a schematic cross-sectional view of a second embodiment of a modular axle and motive wheel system, as described herein.
Figure 3:
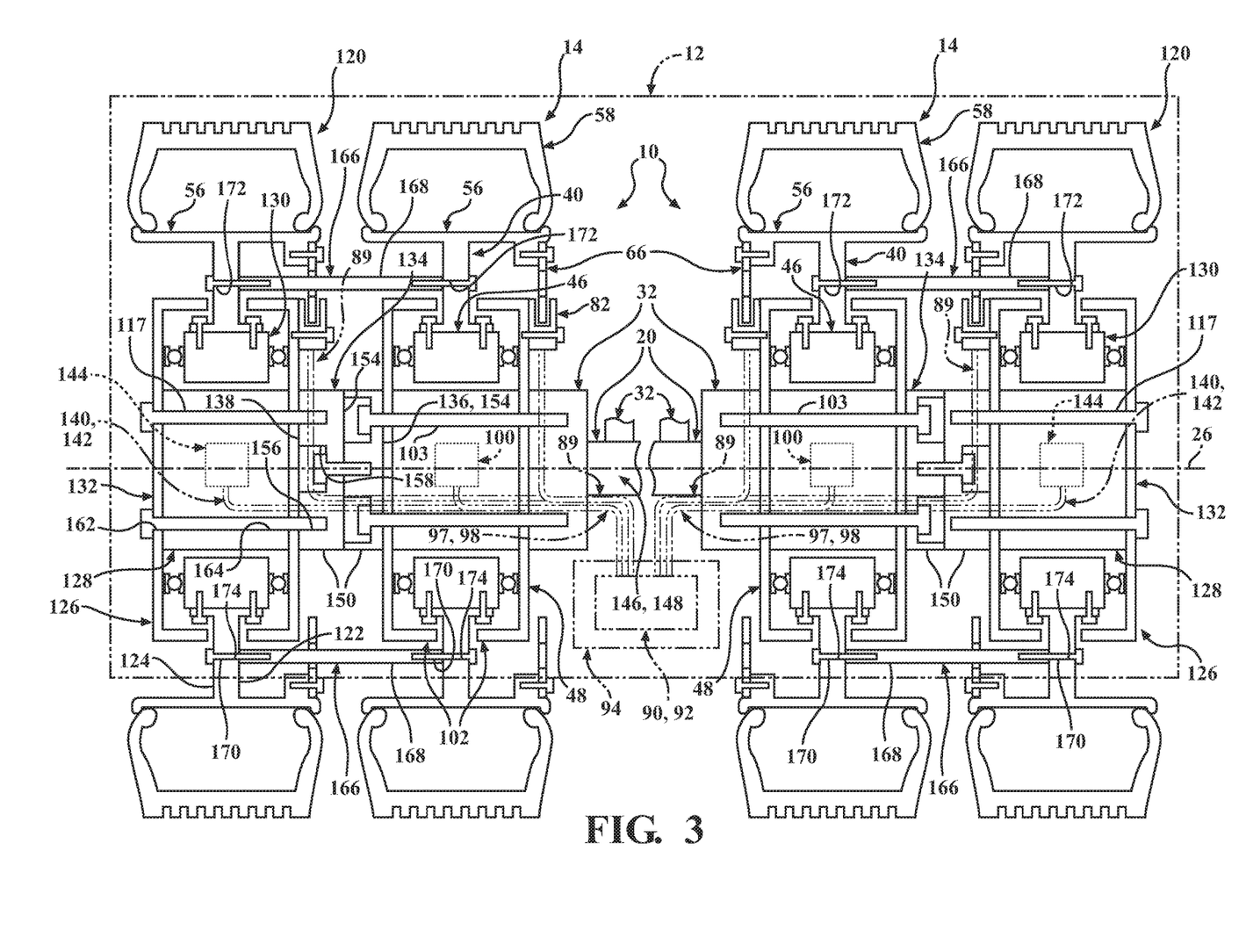
FIG. 3 is a schematic cross-sectional view of a third embodiment of a modular axle and motive wheel system, as described herein.

Referring to FIGS. 2 and 3, in certain embodiments the inner motive wheels 14 of the embodiment of FIG. 1 are advantageously configured for selective attachment and detachment of a pair of outer motive wheels 120 in a modular manner outboard of the inner motive wheels 14. The outer motive wheels 120 are modular in that they may be configured to comprise the same components and features as the inner motive wheels 14, and in the embodiments described herein, the identical components and features as the inner motive wheels, and may be added outboard of the inner motive wheels 14 with very minor modifications of the configuration of the inner motive wheels 14 and no modifications of the axle 20, as illustrated below, for example, in the embodiments of FIGS. 2 and 3. In the embodiments of FIGS. 2 and 3, wherein different reference numbering of the elements and features has been used to differentiate between the inner motive wheels 14 and outer motive wheels 120, but the reference numbers of the components and features are interchangeable.

Referring to FIG. 2, the outer motive wheels 120 each comprise an inner surface 122, outer surface 124, electric outer hub motor 126 comprising an outer stator 128 and an outer rotor 130. The outer stators 128 are configured for selective attachment to and detachment from the inner stators 96. The outer rotors 130 are configured for attachment to the outer surfaces 124 of the outer motive wheels 120. The outer rotors 130 are configured for reversible motive rotation of the outer motive wheels 120 by and about the outer stators 128 in the same manner as described above with regard to inner motive wheels 14.

Referring again to FIG. 2, in one embodiment, the outer motive wheels 120, and particularly outer motor housings 132 and the outer stators 128 are configured for attachment to the respective inner stators 96 through a pair of spacers 134 having inner ends 136 configured for selective attachment and detachment to the inner motor housings 102 and inner stators 96 using a plurality of threaded inner stator fasteners 103, and outer ends 138 configured for selective attachment and detachment to the outer motor housing 132 and outer stators 128 using a plurality of outer stator fasteners 117. The outer hub motors 126 and outer motive wheels 120 may be powered in essentially the same way as the inner hub motors 48. The high voltage AC power described herein may be supplied to the outer hub motors 126 by any suitable outer electrical power and/or signal communication devices 140, such as an outer power buses 142 that comprise electrical conductors configured to electrically communicate high voltage from the power electronics, which may be electrically connected to the outer hub motors 126 by any suitable electrical power attachment, including outer electrical connectors 144. In the embodiment of FIG. 2, each of the inner motive wheels 14 and outer motive wheels 120 is configured for independent reversible motive rotation by the motor controller 92. As such, each of the inner motive wheels 14 and outer motive wheels 120 may be independently rotated at a different wheel speed, as is desirable while driving the vehicle during cornering, or the same speed, as is desirable while driving the vehicle 12 on a straight course, or may be independently regeneratively braked resulting in different wheel speeds. The motor controller 92 may be programmed to control the independent rotation of the outer hub motors 126 and inner hub motors 48 and the rotation of the respective outer motive wheels 120 and inner motive wheels 14.

In one embodiment of the configuration of FIG. 2, the axle 20 comprises a rear axle 146 of the vehicle 12 and the inner motive wheels 14 and outer motive wheels 120 are not steerable, and the vehicle 12 may comprise an electric dually, such as may be employed for various vehicles, including light-duty, medium-duty, and heavy-duty trucks. In another embodiment of the configuration of FIG. 3, the axle 20 comprises a front axle 148 of the vehicle 12 and the inner motive wheels 14 and outer motive wheels 120 are steerable.

In one embodiment of the configuration of FIG. 2, the selective attachment of the outer motive wheels 120 to the inner motive wheels 14 and axle 20 increases the torque output of the axle, the load bearing capacity of the axle, or both the torque output and the load bearing capacity of the axle.

In the embodiments of FIGS. 2-4 and 8, for example, the spacer 134 comprises two identical spacer portions 150 stacked upon one another. The spacer portions 150 comprise high strength cylinders comprising a top 152, a bottom 154, a plurality of threaded blind bores 156 that are radially spaced apart, and a plurality of counterbored through bores 158 that are radially spaced apart. In one embodiment, the plurality of threaded blind bores 156 comprises a lug bolt pattern for a wheel, which in one embodiment (not shown) comprises five (5) equally radially spaced threaded blind bores 156, and in another embodiment (FIG. 8) comprises six (6) equally radially spaced threaded blind bores 156. In one embodiment, the plurality of counterbored through bores 158 comprises five (5) equally radially spaced counterbored through bores 156 equally radially spaced between the threaded blind bores 156, and in another embodiment comprises six (6) equally radially spaced counterbored through bores 158 equally radially spaced between the threaded blind bores 156. In one embodiment, the threaded blind bores 156 of the outermost spacer portion 150 are disposed over the counterbore bores 158 of the innermost spacer portion 150, such that these threaded blind bores 156 and counterbore bores 158 are radially offset from one another. The threaded inner stator fasteners 103 may be used to attach the innermost spacer portions 150 to the axle hubs 32 by passing them through the counterbore bores 158, inner motor housings 102, and inner rotors 46 and then tightening the threaded inner stator fasteners 103 into the threaded axle hub bores 108. The outer stator fasteners 117 may be used to attach the outermost spacer portions 150 to the innermost spacer portions 150 by passing them through the outer motor housing bores 162, outer stator bores 164, and tightening them into the threaded blind bores 156 in the innermost spacer portions 150. The spacers 134 and spacer portions 150 may be made from any suitable high strength material, including various metals, such as, for example, alloys of steel, aluminum, titanium, and magnesium.

Referring to FIG. 3, in one embodiment the modular axle and motive wheel system 10 is identical to the modular axle and motive wheel system 10 of FIG. 2 as described above, except that the inner motive wheels 14 are attached to the adjacent outer motive wheels 120 so that they are interconnected and locked together during rotation. The outer stators 128 are configured for attachment to the adjacent inner stators 96 through a pair of spacers 134 each having an inner end 136 configured for selective attachment and detachment to the inner stator 96 and an outer end 138 configured for selective attachment and detachment to the adjacent outer stator 128 as described above. The outer motive wheels 120 are attached to the adjacent inner motive wheels 14 and the adjacent inner motive wheels and outer motive wheels are configured for locked reversible motive rotation about the axle 20. The inner motive wheels 14 may be attached to the adjacent outer motive wheels 120 by any suitable attachment 166 so that they are interconnected and locked together during rotation. In one embodiment, the attachment 166 comprises an elongated rib 168 that is attached to and extends in an axial direction (i.e. axially) between the inner surface 36 of the wheel hub 40 of the outer motive wheel 120 and the outer surface 38 of the wheel hub 40 of the inner motive wheel 14. The elongated rib 168 may have any suitable cross sectional shape, including a circular shape or an elongated or flattened shape. The elongated rib 168 may be attached to the inner motive wheel 14 and the outer motive wheel 120 by any suitable attachment device including by a plurality of threaded rib fasteners 170 extending through rib bores 172 that may be tightened into threaded rib bores 174. In one embodiment, the elongated ribs 168 are installed by inserting them through the elongated slot 76 in the brake rotor prior to attaching them to the inner motive wheel 14 and the outer motive wheel 120. The motor controller 92 may be programmed to control the dependent rotation of the outer hub motor 126 and inner hub motor 48 and the rotation of the outer motive wheels 120 and inner motive wheels 14.

In one embodiment of the configuration of FIG. 3, the axle 20 comprises a rear axle 146 of the vehicle 12 and the inner motive wheels 14 and outer motive wheels 120 are not steerable, and the vehicle 12 may comprise an electric dually, such as may be employed for various vehicles, including light-duty, medium-duty, and heavy-duty trucks. In another embodiment of the configuration of FIG. 3, the axle 20 comprises a front axle 148 of the vehicle 12 and the inner motive wheels 14 and outer motive wheels 120 are steerable.

In one embodiment of the configuration of FIG. 3, the selective attachment of the outer motive wheels 120 to the inner motive wheels 14 and axle 20 increases the torque output of the axle, the load bearing capacity of the axle, or both the torque output and the load bearing capacity of the axle.

Figure 4:
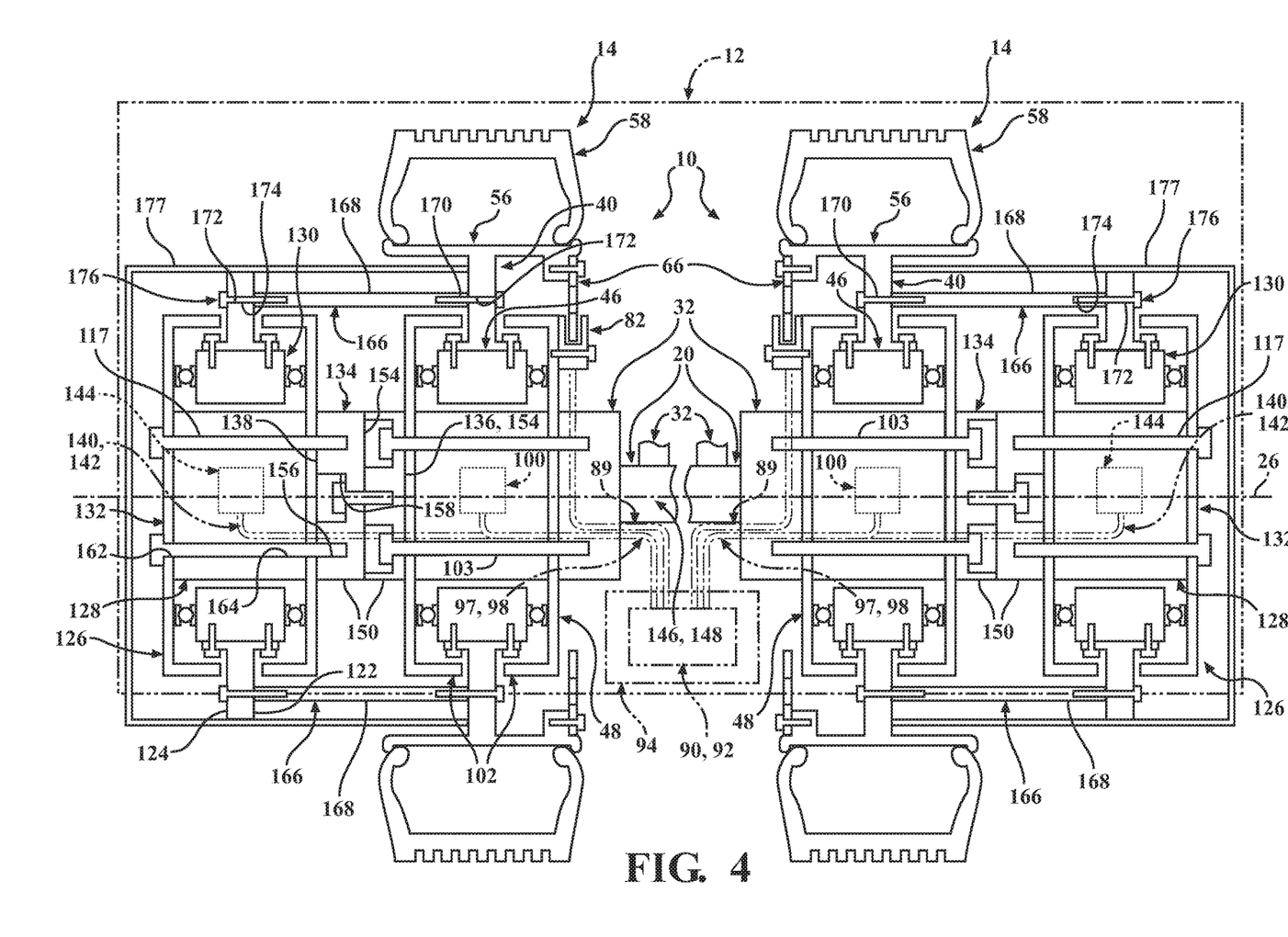
FIG. 4 is a schematic cross-sectional view of a fourth embodiment of a modular axle and motive wheel system, as described herein.

Referring to FIG. 4, in one embodiment the inner motive wheels 14 of the embodiment of FIG. 1 are advantageously configured for selective attachment and detachment of a pair of outer hub motors 126 in a modular manner outboard of the inner motive wheels 14. The outer hub motors 126 are modular in that they may be configured to comprise the same components as the inner hub motors 48, and in some embodiments, the identical components as the inner hub motors 48, and may be added outboard of the inner motive wheels 14 with very minor modifications of the configuration of the inner motive wheels 14 and no modifications of the axle 20, as illustrated below, for example, in the embodiments of FIG. 4.

Figure 8:
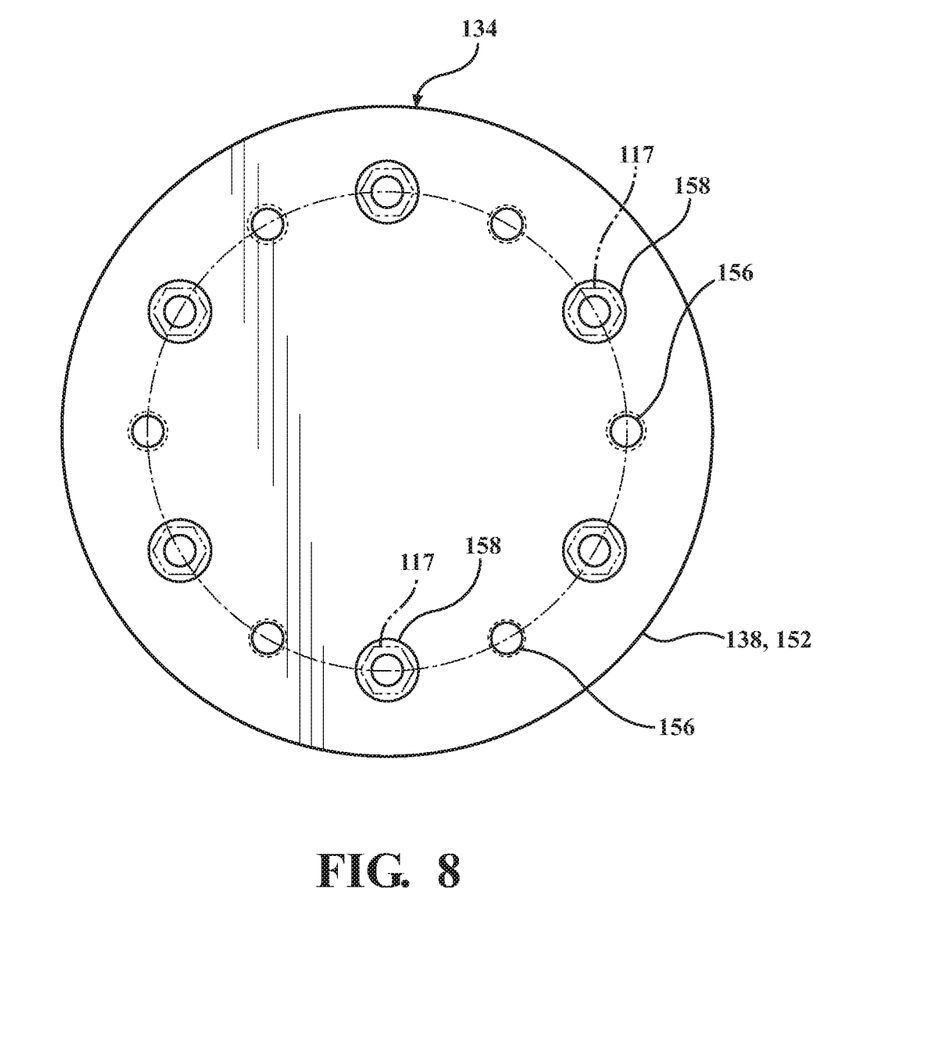
FIG. 8 is a schematic top view of an embodiment of a spacer, as described herein.

Referring to FIGS. 4 and 8, in one embodiment the modular axle and motive wheel system 10 is identical to the modular axle and motive wheel system 10 of FIG. 1, and similar to the embodiment of FIG. 3, except that the inner motive wheels 14 are configured for attachment to an adjacent outer hub motor 126 and a truncated wheel hub 176, which comprises an inner portion of a wheel hub 40 an its associated components as described herein that is not attached to a wheel rim 56, so that they are interconnected and locked together during rotation. The outer stators 128 are configured for attachment to the adjacent inner stators 96 through a pair of spacers 134 each having an inner end 136 configured for selective attachment and detachment to the inner stator 96 and an outer end 138 configured for selective attachment and detachment to the adjacent outer stator 128 as described above. The outer rotors 130 and truncated wheel hubs 176 are attached to the adjacent wheel hubs 40 and inner rotors 46 and are configured for locked reversible motive rotation about the axle 20. The inner motive wheels 14 may be attached to the adjacent outer hub motors 126 and truncated wheel hubs 176 by any suitable attachment 166 so that they are interconnected and locked together during rotation. In one embodiment, the attachment 166 comprises an elongated rib 168 that is attached to and extends in an axial direction (i.e. axially) between the inner surface 36 of the truncated wheel hub 176 of the outer hub motor 126 and the outer surface 38 of the wheel hub 40 of the inner motive wheel 14. The elongated rib 168 may have any suitable cross sectional shape, including a circular shape or an elongated or flattened shape. The elongated rib 168 may be attached to the inner motive wheel 14 and the truncated wheel hub 176 by any suitable attachment device including by a plurality of threaded rib fasteners 170 extending through rib bores 172 that may be tightened into threaded rib bores 174. In locked engagement of the truncated wheel hub 176 and wheel hub 40, the outer rotors 130 and inner rotors 46 configured for locked reversible motive rotation of the inner motive wheels 14 by and about the inner stators 96. The motor controller 92 is programmed to control the dependent rotation of the outer hub motor 126 and inner hub motor 48. In one embodiment, the modular axle and motive wheel system 10 of FIG. 4 also comprises a pair of selectively attachable and detachable outer motor housings 177 disposed over the outer hub motors 126 to protect the outer hub motors from contact with external objects and the external environment.

In one embodiment of the configuration of FIG. 4, the axle 20 comprises a rear axle 146 of the vehicle 12 and the inner motive wheels 14 comprising the outer hub motors 126 are not steerable. In another embodiment of the configuration of FIG. 4, the axle 20 comprises a front axle 148 of the vehicle 12 and the inner motive wheels 14 comprising the outer hub motors 126 are steerable.

In one embodiment of the configuration of FIG. 4, the selective attachment of the outer hub motors 126 to the inner motive wheels 14 and axle 20 increases the torque output of the axle 20 and the vehicle 12, the towable load capacity of the axle 20 and vehicle 12, or both the torque output and the towable load capacity of the axle or vehicle.

Figure 5:
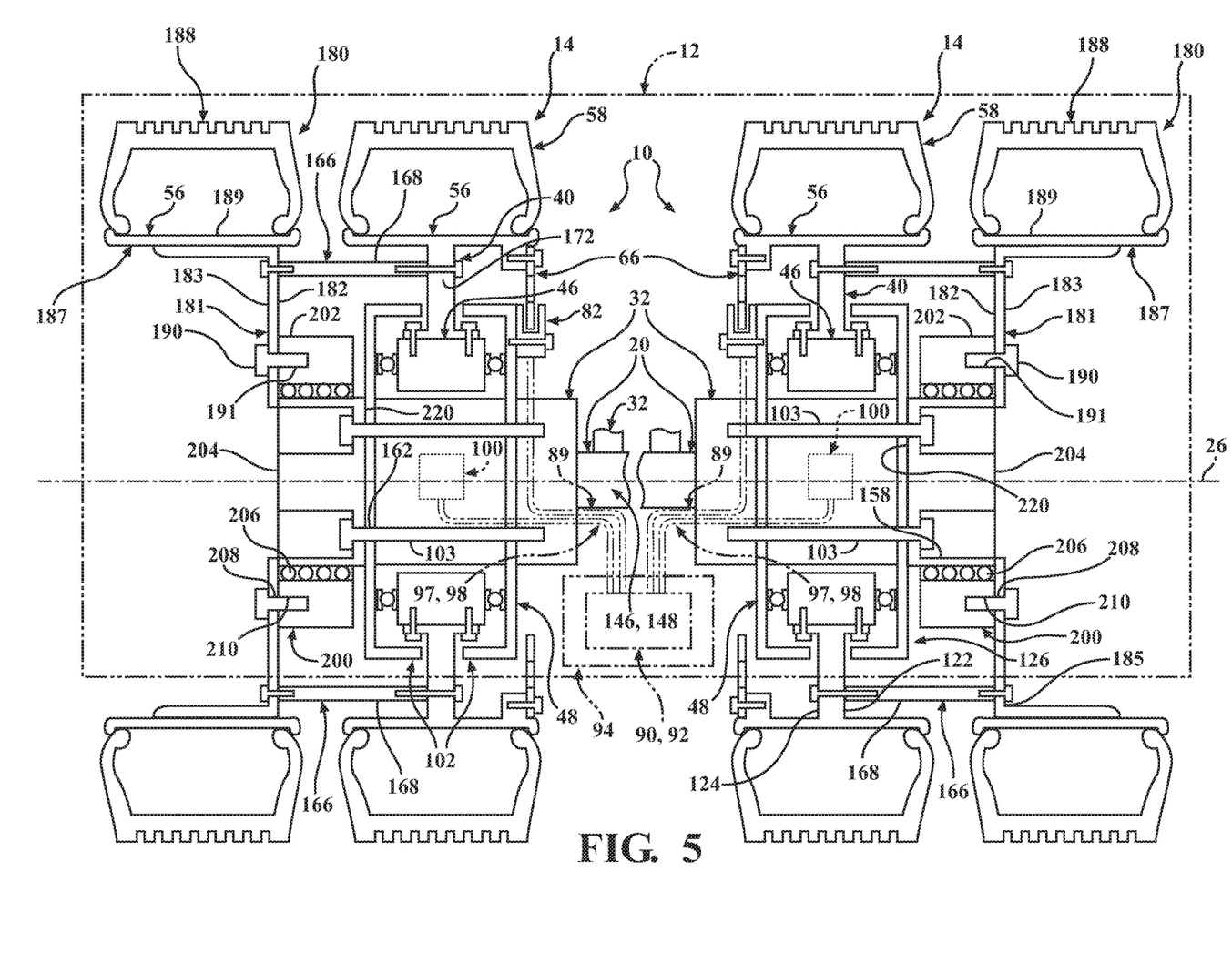
FIG. 5 is a schematic cross-sectional view of a fifth embodiment of a modular axle and motive wheel system, as described herein.
Figure 9:
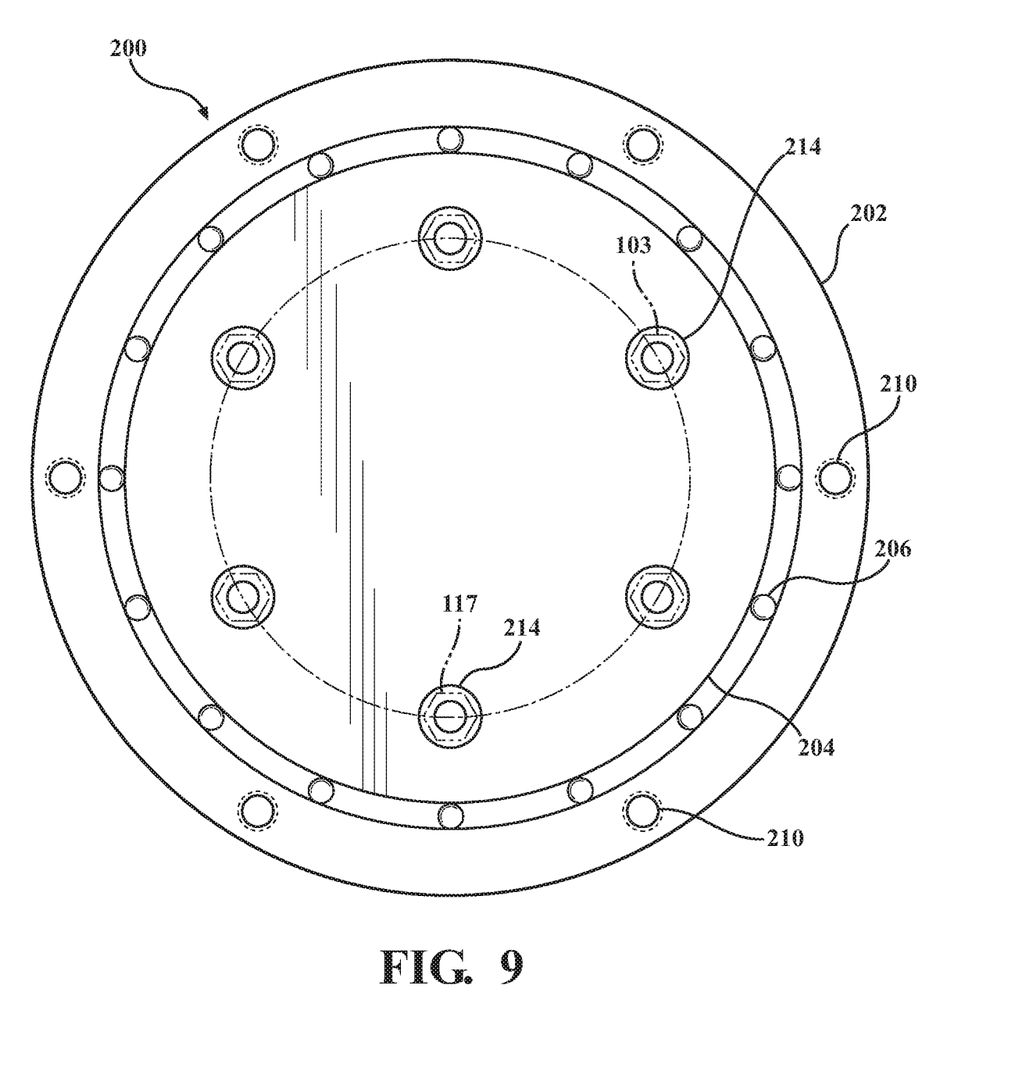
FIG. 9 is a schematic top view of an embodiment of a spacer, as described herein.

Referring to FIGS. 5 and 9, in one embodiment the modular axle and motive wheel system 10 is identical to the modular axle and motive wheel system 10 of FIG. 1 as described above, except that the inner motive wheels 14 are configured for attachment to a pair of adjacent outer non-motive wheels 180 so that they are interconnected and locked together during rotation. The outer non-motive wheels 180 are unpowered and do not include a hub motor as described herein. The outer non-motive wheels 180 comprise outer wheel hubs 181 that are generally cylindrical and extend radially outwardly away from the axle axis 26. The outer wheel hubs 181 comprise inner surfaces 182, outer surfaces 183, inner ends 184, and outer ends 185. The outer wheel hubs 181 also comprise axle openings 186 that are configured for concentric disposition about the axle axis 26. The outer non-motive wheels 180 also comprise outer wheel rims 187 that extend axially outwardly away from the inner surfaces 182 and the outer surfaces 183 and are configured to receive outer tires 188, such as selectively inflatable and deflatable tires, in sealing engagement on rim surfaces 189 in a conventional manner. The outer wheel hubs 181 are configured for attachment to the adjacent inner stators 96 through a pair of rotatable bearing spacers 200 as described above each having inner ends 220 configured for selective attachment and detachment to the inner stator 96 and outer ends 208 configured for selective attachment and detachment to the inner surfaces 182 of the outer wheel hubs 181. The rotatable bearing spacer 200 comprises cylindrical outer bearing spacer portions 202 that are concentrically and rotatably disposed over the cylindrical inner bearing spacer portions 204 with bearing races 206 each comprising a plurality of bearings disposed between them. The cylindrical outer bearing spacer portions 202 and cylindrical inner bearing spacer portions 204 comprise high strength cylinders. The bearing spacers 200 and cylindrical outer spacer portions 202 and cylindrical inner spacer portions 204 may be made from any suitable high strength material, including various metals, such as, for example, alloys of steel, aluminum, titanium, and magnesium. The outer ends 208 of rotatable bearing spacer 200, particularly the cylindrical outer bearing spacer portions 202 comprise a plurality of threaded blind bores 210 that are radially spaced apart. In one embodiment, the plurality of threaded blind bores 210 comprises a lug bolt pattern for a wheel as described above. The outer ends 212 of the cylindrical inner bearing spacer portions 204 comprise a plurality of counterbored through bores 214 that are radially spaced apart. In one embodiment, the plurality of counterbored through bores 214 comprises a lug bolt pattern for a wheel as described above. In one embodiment, the threaded inner stator fasteners 103 may be used to attach the cylindrical inner bearing spacer portions 204 to the axle hubs 32 by passing them through the counterbore through bores 214, inner motor housings 102, and inner rotors 46 and then tightening the threaded inner stator fasteners 103 into the threaded axle hub bores 108. In one embodiment, the outer wheel hubs 181 are attached to the rotatable bearing spacers 200 by a plurality of outer lugs 190 that are passed through lug bores 191 that are radially spaced apart in a lug bolt pattern as described herein by passing outer lugs 190 through the lug bores 191 and tightening the outer lug bolts into the threaded blind bores 210 of the cylindrical outer bearing spacer portion 202.

The outer non-motive wheels 180 are attached to the adjacent inner motive wheels 14 and the adjacent inner motive wheels and outer non-motive wheels are configured for locked reversible motive rotation about the axle 20. The inner motive wheels 14 may be attached to the adjacent outer non-motive wheels 180 by any suitable attachment 166 so that they are interconnected and locked together during rotation. In one embodiment, the attachment 166 comprises an elongated rib 168 that is attached to and extends in an axial direction (i.e. axially) between the inner surface 182 of the wheel hub 181 of the outer non-motive wheel 180 and the outer surface 38 of the wheel hub 40 of the inner motive wheel 14. The elongated rib 168 may have any suitable cross sectional shape, including a circular shape or an elongated or flattened shape. The elongated rib 168 may be attached to the inner motive wheel 14 and the outer non-motive wheel 180 by any suitable attachment device including by a plurality of threaded rib fasteners 170 extending through rib bores 172 that may be tightened into threaded rib bores 174. The motor controller 92 may be programmed to control the dependent rotation of the inner hub motor 48 and the dependent rotation of the outer non-motive wheels 180 and inner motive wheels 14.

In one embodiment of the configuration of FIG. 5, the axle 20 comprises a rear axle 146 of the vehicle 12 and the inner motive wheels 14 and outer non-motive wheels 180 are not steerable, and the vehicle 12 may comprise an electric dually, such as may be employed for various vehicles, including light-duty, medium-duty, and heavy-duty trucks. In another embodiment of the configuration of FIG. 5, the axle 20 comprises a front axle 148 of the vehicle 12 and the inner motive wheels 14 and outer non-motive wheels 180 are steerable.

In one embodiment of the configuration of FIG. 5, the selective attachment of the outer non-motive wheels 180 to the inner motive wheels 14 and axle 20 increases the load bearing capacity of the axle 20 by distribution the load between the outer motive wheels and the inner motive wheels.

Figure 6:
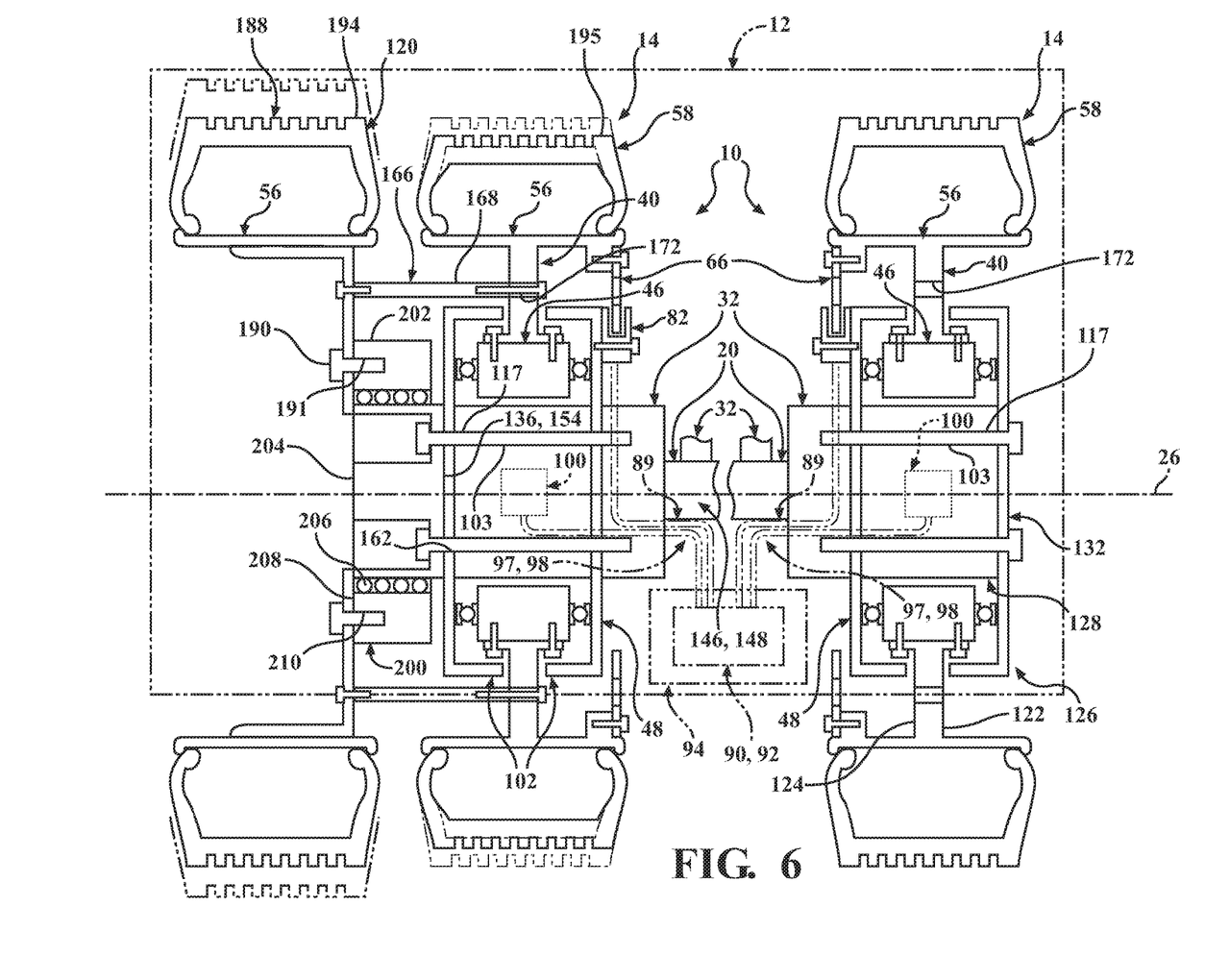
FIG. 6 is a schematic cross-sectional view of a sixth embodiment of a modular axle and motive wheel system, as described herein.

Referring to FIGS. 6 and 9, in one embodiment the modular axle and motive wheel system 10 is identical to the modular axle and motive wheel system 10 of FIG. 1 as described above, and similar to the embodiment of FIG. 5 as described above, except that the inner motive wheels 14 are configured for attachment to only one adjacent outer non-motive wheel 180 so that they are interconnected and locked together during rotation. The outer non-motive wheel 180 is unpowered and does not include a hub motor as described herein. The outer non-motive wheel 180 is configured as described above and may be attached in the manner described above with reference to the non-motive wheels 180 of the embodiment of FIG. 5. The outer tire 188, such as a selectively inflatable and deflatable tire, is in sealing engagement on the rim surface 189 in a conventional manner. The outer tire 188 may comprise a spare tire 194 that may be the same as the tire 58 of the inner motive wheel 14 or different in width or diameter, including in one embodiment having a diameter that is equal to or greater than that of tire 58 as illustrated in FIG. 6, which is particularly desirable in the event that the tire 58 of the adjacent inner motive wheel 14 has become flat or lost all or a significant portion of the air or other gas used to inflate the tire as also illustrated in FIG. 6. The outer non-motive wheel 180 is attached to the adjacent inner motive wheel 14 and the adjacent inner motive wheel and outer non-motive wheel are configured for locked reversible motive rotation about the axle 20. The inner motive wheels 14 may be attached to the adjacent outer non-motive wheels 180 by any suitable attachment 166 as describe above. In one embodiment, the spare tire 194 is selected to preserve the tractive effort of the inner motive wheel 14 to which it is attached, thereby maintaining the original torque output and load bearing capacity of the modular axle and motive wheel system 10.

Figure 7:
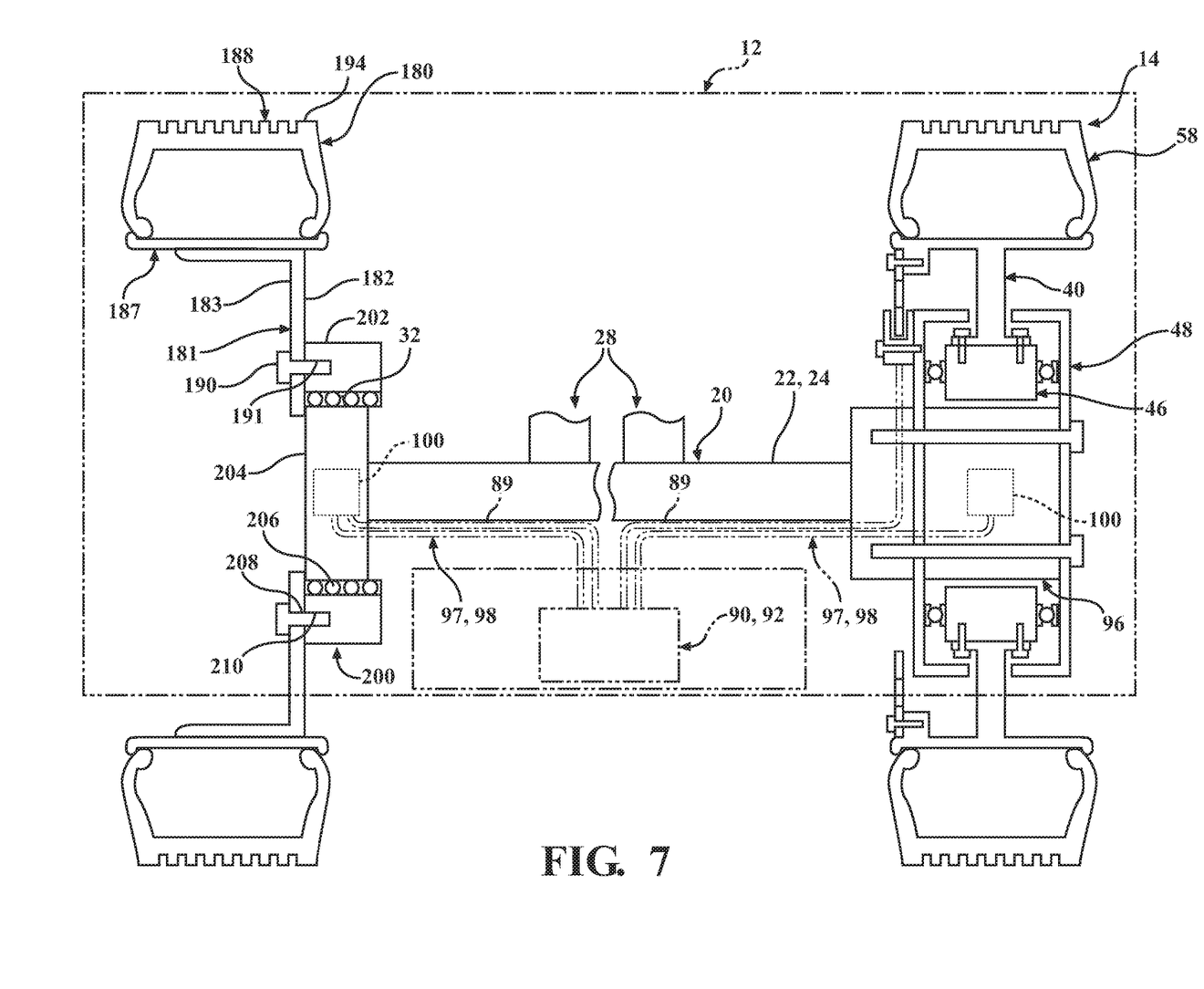
FIG. 7 is a schematic cross-sectional view of a seventh embodiment of a modular axle and motive wheel system, as described herein.

Referring to FIGS. 7 and 9, in one embodiment the modular axle and motive wheel system 10 is identical to the modular axle and motive wheel system 10 of FIG. 1. In this embodiment, the inner motive wheels are configured for removal as described above. In the event of a flat tire 195 or the failure of or damage to one of the inner motive wheel 14 that renders it non-rotatable, or where continued use of the failed or damaged inner motive wheel 14 is undesirable, the failed or damaged inner motive wheel 14 the may be replaced by a rotatable outer non-motive wheel 180, particularly a spare tire 194 as described above, attached to the axle hub 32.

The outer non-motive wheel 180 comprises outer wheel hub 181 that is generally cylindrical and extend radially outwardly away from the axle axis 26. The outer wheel hub 181 comprises inner surface 182, outer surface 183, inner end 184, and opposed outer end 185. The outer wheel hubs 181 also comprise axle openings 186 that is configured for concentric disposition about the axle axis 26. The outer non-motive wheel 180 also comprise outer wheel rim 187 that extends axially outwardly away from the inner surface 182 and the outer surface 183 and is configured to receive outer tires 188, such as selectively inflatable and deflatable tires, in sealing engagement on rim surfaces 189 in a conventional manner. The outer wheel hub 181 is configured for attachment to the axle hub 32 through a rotatable bearing spacer 200 as described above having inner end 220 configured for selective attachment and detachment to the wheel hub 32 and outer end 208 configured for selective attachment and detachment to the inner surface 182 of the outer wheel hub 181. The rotatable bearing spacer 200 is as described above. In one embodiment, threaded hub fasteners 222 may be used to attach the cylindrical inner bearing spacer portion 204 to the axle hubs 32 by passing them through the counterbore through bores 214 and then tightening the threaded hub fasteners 222 into the threaded axle hub bores 108. In one embodiment, the outer wheel hubs 181 are attached to the rotatable bearing spacers 200 by a plurality of outer lugs 190 that are passed through lug bores 191 that are radially spaced apart in a lug bolt pattern as described herein by passing outer lugs 190 through the lug bores 191 and tightening the outer lug bolts into the threaded blind bores 210 of the cylindrical outer bearing spacer portion 202.

In one embodiment, the replacement of the inner motive wheel 14 with an outer non-motive wheel 180 and spare tire 194 enables the continued motive use of the vehicle 12 albeit with a reduced torque output of the axle 20 due to the removal of the inner motive wheel 14. The inner electrical power and/or signal communication device 97, such as an inner power bus 98, inner electrical connector 100, and brake power bus are not operable and may be attached to the axle hub 32 for support.

The terms "a" and "an" herein do not denote a limitation of quantity, but rather denote the presence of at least one of the referenced items. The modifier "about" used in connection with a quantity is inclusive of the stated value and has the meaning dictated by the context (e.g., includes the degree of error associated with measurement of the particular quantity). Furthermore, unless otherwise limited all ranges disclosed herein are inclusive and combinable (e.g., ranges of "up to about 25 weight percent (wt. %), more particularly about 5 wt. % to about 20 wt. % and even more particularly about 10 wt. % to about 15 wt. %" are inclusive of the endpoints and all intermediate values of the ranges, e.g., "about 5 wt. % to about 25 wt. %, about 5 wt. % to about 15 wt. %", etc.). The use of "about" in conjunction with a listing of items is applied to all of the listed items, and in conjunction with a range to both endpoints of the range. Finally, unless defined otherwise, technical and scientific terms used herein have the same meaning as is commonly understood by one of skill in the art to which this invention belongs. The suffix "(s)" as used herein is intended to include both the singular and the plural of the term that it modifies, thereby including one or more of that term (e.g., the metal(s) includes one or more metals). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments.

It is to be understood that the use of "comprising" in conjunction with the components or elements described herein specifically discloses and includes the embodiments that "consist essentially of" the named components (i.e., contain the named components and no other components that significantly adversely affect the basic and novel features disclosed), and embodiments that "consist of" the named components (i.e., contain only the named components).

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A modular axle and motive wheel system for a vehicle, comprising:
    a pair of opposed axle ends comprising an axle, the opposed axle ends axially spaced apart along an axle axis;
    a pair of axle hubs attached to the axle ends;
    a pair of inner motive wheels each comprising an inner surface and an outer surface and configured for radially extending rotatable disposition on the axle hubs; and
    a pair of inner electric hub motors each comprising an inner stator and an inner rotor, the inner stators configured for selective attachment to and detachment from the axle hubs, the inner rotors configured for selective attachment to and detachment from the inner motive wheels, the inner rotors configured for reversible motive rotation of the inner motive wheels by and about the inner stators in an operational one motive wheel per axle end configuration, the inner motive wheels configured for selective attachment and detachment of a pair of outer motive wheels outboard of the inner motive wheels, the outer motive wheels each comprising an inner surface and an outer surface and comprising an outer electric hub motor comprising an outer stator and an outer rotor, the outer stators configured for selective attachment to and detachment from the inner stators, the outer rotors configured for attachment to the outer motive wheels, the outer rotors configured for reversible motive rotation of the outer motive wheels by and about the outer stators in an operational dual motive wheel per axle end configuration.

2. The modular axle and motive wheel system of claim 1, wherein the outer stators are configured for attachment to the inner stators through a pair of spacers having inner ends configured for selective attachment and detachment to the inner stators and outer ends configured for selective attachment and detachment to the outer stators, and wherein each of the inner motive wheels and outer motive wheels is configured for independent reversible motive rotation.

3. The modular axle and motive wheel system of claim 1, wherein the axle comprises a rear axle of the vehicle and the inner motive wheels and outer motive wheels are not steerable.

4. The modular axle and motive wheel system of claim 1, wherein the axle comprises a front axle of the vehicle and the inner motive wheels and outer motive wheels are steerable.

5. The modular axle and motive wheel system of claim 1, wherein the selective attachment of the outer motive wheels increases a torque output of the axle, a load bearing capacity of the axle, or both the torque output and the load bearing capacity.

6. The modular axle and motive wheel system of claim 1, wherein the outer stators are configured for attachment to the inner stators through a pair of spacers having inner ends configured for selective attachment and detachment to the inner stators and outer ends configured for selective attachment and detachment to the outer stators, and wherein the outer motive wheels are attached to the inner motive wheels, and wherein adjacent inner motive wheels and outer motive wheels are configured for locked reversible motive rotation.

7. The modular axle and motive wheel system of claim 6, wherein the axle comprises a rear axle of the vehicle and the inner motive wheels and outer motive wheels are not steerable.

8. The modular axle and motive wheel system of claim 6, wherein the axle comprises a front axle of the vehicle and the inner motive wheels and outer motive wheels are steerable.

9. The modular axle and motive wheel system of claim 6, wherein the selective attachment of the outer motive wheels increases a torque output of the axle, a load bearing capacity of the axle, or both the torque output and the load bearing capacity.

10. A modular axle and motive wheel system for a vehicle, comprising:
    a pair of opposed axle ends comprising an axle, the opposed axle ends axially spaced apart along an axle axis;
    a pair of axle hubs attached to the axle ends;
    a pair of inner motive wheels each comprising an inner surface and an outer surface and configured for radially extending rotatable disposition on the axle hubs; and
    a pair of inner electric hub motors each comprising an inner stator and an inner rotor, the inner stators configured for selective attachment to and detachment from the axle hubs, the inner rotors configured for selective attachment to and detachment from the inner motive wheels, the inner rotors configured for reversible motive rotation of the inner motive wheels by and about the inner stators in an operational one motive wheel per axle end configuration, the inner stators configured for attachment of either, a pair of spacers each having an inner end configured for selective attachment to and detachment from the inner stator and an outer end configured for selective attachment to and detachment from one of a pair of outer electric hub motors or a pair of rotatable bearing spacers each having an inner end configured for selective attachment to and detachment from the inner stator and an outer end configured for selective attachment to and detachment from a pair of outer non-motive wheels, or one rotatable bearing spacer having an inner end configured for selective attachment to and detachment from one of the inner stators and an outer end configured for selective attachment to and detachment from a non-motive wheel.

11. The modular axle and motive wheel system of claim 10, wherein the axle comprises a rear axle of the vehicle and the inner motive wheels and outer motive wheels are not steerable.

12. The modular axle and motive wheel system of claim 10, wherein the axle comprises a front axle of the vehicle and the inner motive wheels and outer motive wheels are steerable.

13. The modular axle and motive wheel system of claim 10, wherein the outer ends of the spacers are configured for selective attachment to and detachment from the pair of outer electric hub motors, each outer electric hub motor comprising an outer stator and an outer rotor, the outer stators configured for selective attachment to and detachment from the inner stators, the outer rotors configured for selective attachment to and detachment from the inner rotors, the outer rotors and inner rotors configured for reversible motive rotation of the inner motive wheels by and about the inner stators.

14. The modular axle and motive wheel system of claim 13, further comprising a pair of outer motor housings disposed over and covering the outer electric hub motors.

15. The modular axle and motive wheel system of claim 13, wherein the selective attachment of the outer electric hub motors increases a torque output of the axle.

16. The modular axle and motive wheel system of claim 10, wherein the outer ends of the rotatable bearing spacers are configured for selective attachment to and detachment from the pair of non-motive wheels, and wherein the selective attachment of the outer non-motive wheels increases a load bearing capacity of the axle.

17. The modular axle and motive wheel system of claim 10, wherein the outer end of the one rotatable bearing spacer is configured for selective attachment and detachment of the non-motive wheel, and wherein the non-motive wheel comprises a spare tire disposed thereon.

18. The modular axle and motive wheel system of claim 17, wherein the spare tire has a diameter that is greater than or equal to a diameter of a pair of tires disposed on the inner motive wheels.

\* \* \* \* \*